United States Patent
Goodwin

(10) Patent No.: US 9,237,261 B2
(45) Date of Patent: Jan. 12, 2016

(54) APPARATUS AND METHOD FOR IMPROVING CONTRAST DETECTED IN A FRINGE PROJECTION AUTOFOCUS SYSTEM

(71) Applicant: Nikon Corporation, Tokyo (JP)

(72) Inventor: Eric Peter Goodwin, Tucson, AZ (US)

(73) Assignee: Nikon Corporation (JP)

( * ) Notice: Subject to any disclaimer, the term of this patent is extended or adjusted under 35 U.S.C. 154(b) by 180 days.

(21) Appl. No.: 13/746,229

(22) Filed: Jan. 21, 2013

(65) Prior Publication Data

US 2013/0188084 A1 Jul. 25, 2013

Related U.S. Application Data

(60) Provisional application No. 61/589,370, filed on Jan. 22, 2012.

(51) Int. Cl.
*H04N 5/225* (2006.01)
*H04N 5/357* (2011.01)

(52) U.S. Cl.
CPC .............. *H04N 5/225* (2013.01); *H04N 5/357* (2013.01)

(58) Field of Classification Search
CPC ................................ H04N 5/225; H04N 5/357
USPC .................. 348/135; 250/370, 216, 578.1
See application file for complete search history.

(56) References Cited

U.S. PATENT DOCUMENTS

| | | | |
|---|---|---|---|
| 2004/0027581 A1* | 2/2004 | Dulman | 356/511 |
| 2007/0266875 A1* | 11/2007 | Berge | 101/481 |
| 2010/0299103 A1* | 11/2010 | Yoshikawa | 702/167 |
| 2011/0071784 A1* | 3/2011 | Smith et al. | 702/94 |
| 2012/0001058 A1* | 1/2012 | Luke et al. | 250/208.2 |
| 2012/0008150 A1 | 1/2012 | Smith | |
| 2013/0050526 A1* | 2/2013 | Keelan | 348/231.99 |
| 2013/0208104 A1 | 8/2013 | Goodwin | |

OTHER PUBLICATIONS

U.S. Appl. No. 13/794,353, filed Mar. 11, 2013, first inventor Eric Peter Goodwin, (Unpublished).
Article Sub-Niquist Inferometry, author John Grievenkamp, Applied Optics vol. 26, No. 24, Dec. 15, 1987, pp. 5245-5258.
Greivenkamp, John, "Sub-Nyquist Interferometry", Applied Optics, vol. 26, No. 24, Dec. 15, 1987; pp. 5245-5258.

* cited by examiner

*Primary Examiner* — Mekonnen Dagnew
(74) *Attorney, Agent, or Firm* — Yakov Sidorin; Quarles & Brady LLP

(57) ABSTRACT

A method and apparatus are provided, for improving contrast detected in a fringe projection autofocus system that projects light from a substrate to a digital camera. The method and apparatus reduce the fill factor of the digital camera in a direction that improves the contrast at spatial frequencies near or above the Nyquist limit in that direction.

11 Claims, 4 Drawing Sheets

APPARATUS AND METHOD FOR IMPROVING CONTRAST DETECTED IN A FRINGE PROJECTION AUTOFOCUS SYSTEM

RELATED APPLICATION/CLAIM OF PRIORITY

This application is related to and claims the priority of Provisional Application No. 61/589,370, filed Jan. 22, 2012, and entitled Sub-Nyquist mask for improved fringe projection autofocus system; which provisional application is incorporated by reference herein.

INTRODUCTION

One embodiment of the present invention relates to a surface position detecting system, more specifically, a new and useful concept for improving contrast in a fringe projection autofocus (AF) system. The embodiment is particularly useful with a fringe projection autofocus system of the type disclosed in U.S. patent application Ser. No. 13/066,741, filed Apr. 22, 2011 and entitled Autofocus system and method, which application is incorporated by reference herein.

A fringe projection autofocus system, of a type to which the embodiment applies, is a system that basically projects light from a substrate to a digital camera that functions as a detector and provides information about the topography of the substrate (e.g. a substrate that is used in the production of a semiconductor wafer). Currently, the digital camera would comprise a charge couple device (CCD) or a Complementary metal-oxide-semiconductor (CMOS), each of which would have an array of pixels oriented in x-y directions. Light reflected from the substrate is projected to the camera, detected by the pixels of the camera and transmitted to a processor that provides information about the topography of the substrate.

SUMMARY

The present embodiment improves contrast in a digital camera (e.g. of the CCD or CMOS type) that functions as a detector in a fringe projection autofocus system.

According to a preferred embodiment, a 1D mask is applied to a 2D pixel array of the digital camera, so that the fill factor in a direction (e.g. the x direction) in which the fringe frequency of the projected fringes is otherwise near the Nyquist limit is reduced to a predetermined extent but the fill factor in a transverse direction where the fringe frequency is not near the Nyquist limit (e.g. the y direction) is substantially maintained.

Thus, the present embodiment effectively sacrifices some of the fill factor that would reduce contrast, by reducing the fill factor of the digital camera in a direction that improves the contrast at spatial frequencies near the Nyquist limit in that direction.

In a preferred version of the present embodiment, applicant applies a 1D mask to each pixel of the digital camera, to reduce the fill factor in the x direction, with minimal, and preferably no, reduction of the fill factor in the y direction. Since the fringe pitch in the y direction is generally significantly lower than the Nyquist limit, while the fringe pitch in the x direction is closer to the Nyquist limit, reducing the fill factor in the x direction, with minimal or no reduction in fill factor in the y direction, leads to fringe projection with better fringe contrast, reduced sensitivity to camera noise, and more accurate measurement of substrate topography.

Other features of the present invention will become further apparent from the following detailed description and the accompanying drawings.

DETAILED DESCRIPTION

As discussed above, the present embodiment relates to a new and useful concept for improving contrast, that is particularly useful in a fringe projection autofocus system of the type shown in application Ser. No. 13/066,741, incorporated by reference herein.

Figure 1:
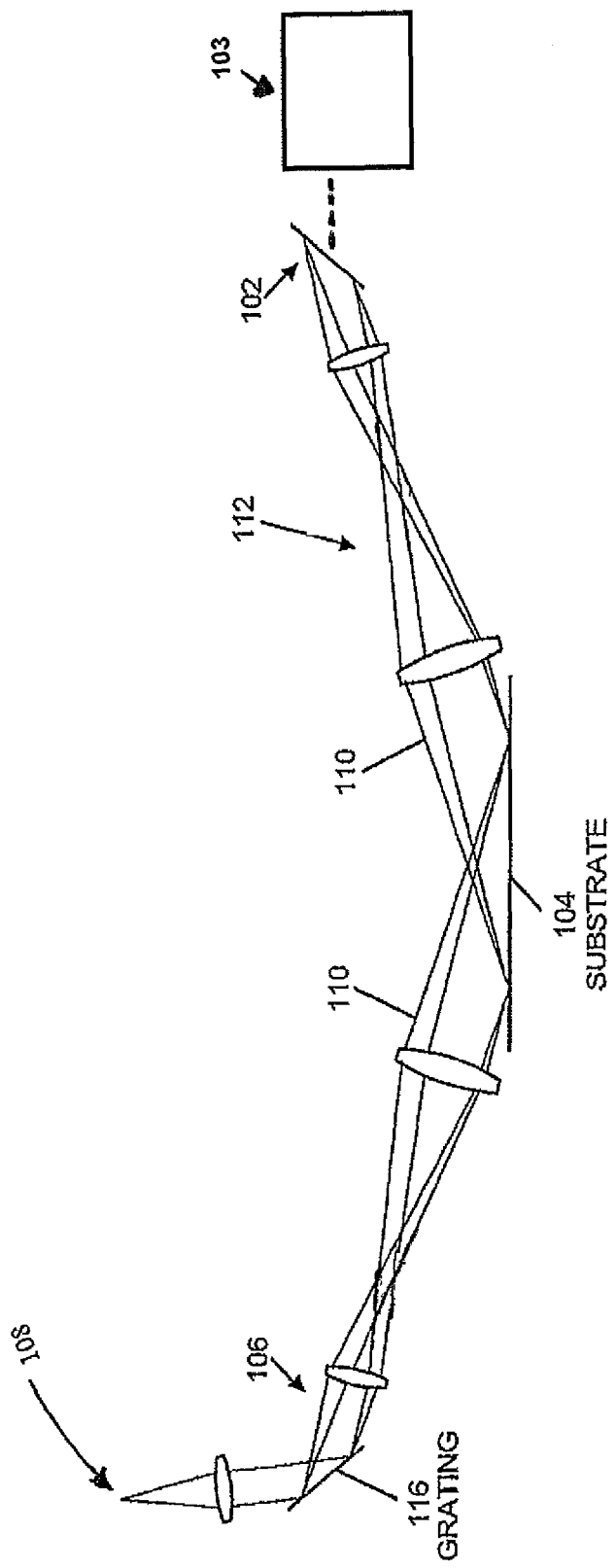
FIG. 1 is a schematic illustration of a fringe projection autofocus system of the type with which the present embodiment is particularly useful.

FIG. 1 schematically illustrates a fringe projection autofocus system, of a type shown in application Ser. No. 13/066,741, incorporated by reference herein. The fringe projection autofocus system basically projects light from a substrate 104 (e.g. the surface of the substrate) to a digital camera 102 that functions as a detector and detects projected light that is used to provide information about the topography of the substrate (e.g. a substrate that is used in the production of a semiconductor wafer). Currently, the digital camera 102 would comprise a charge couple device (CCD) or a CMOS type camera, each of which would have an array of pixels oriented in x-y directions (two dimensional array of pixels). Light reflected from the substrate 104 is projected to the camera 102, detected by the pixels of the camera and transmitted to a processor that provides information about the topography of the substrate.

As shown in FIG. 1, in the autofocus system and method of application Ser. No. 13/066,741, the digital camera 102 is configured to detect a fringe projection from the substrate 104 that is movable relative to an imaging location. The fringe projection system 106 projects fringes onto the substrate 104 (in a manner such that the projected fringes interfere at the substrate surface), a fringe relay system 112 relays projected fringes from the substrate 104 to the fringe detection camera 102, and a processing system 103 processes data from the fringe detection camera 102 and produces output related to the topography of the substrate (and/or orientation of the substrate relative to the imaging location). The fringe projection system comprises a grating 116 that is illuminated from a source (or a plurality of sources) 108 and produces fringes comprising diffracted light from the grating 116 that are projected onto the substrate 104 and interfere at the substrate surface. The fringes are in the form of sinusoidal irradiance patterns that are projected onto the substrate. Moreover, the fringe projection system is preferably configured to project only +1 and −1 diffracted orders, producing a sinusoidal irradiance patterns on the substrate, the relay system 112 is configured such that all projected fringes have nearly the same spatial frequency, and the processing system uses detected shifts in the projected fringes in producing output related to the orientation of the substrate relative to the imaging location. The fringe detection system 102 comprises a digital camera, e.g. a CCD or CMOS camera that is the subject of the present embodiment.

In a fringe projection autofocus method, fringes are projected from the source 108 (that may comprise a plurality of light sources) onto the substrate 104 that is moveable relative to the imaging location, where the fringes are produced by beams 110 from each of the one or more sources that are directed onto and reflected by the substrate 104. The reflected beams from the substrate are relayed to the fringe detection system 102 in a manner such that the beams interfere at the fringe detection system.

In the autofocus system and method, when light is projected to the digital camera 102, it is often desirable for the camera to receive as much projected light as possible, to produce as good an image as possible. That means that the fill factor, the amount of projected light that is received by the camera, is as large as possible, approaching 100%. However, in a fringe projection autofocus system, where light fringes are projected to the digital camera, it is the contrast between portions of the projected light that is important, to provide the type of data that is useful to the system. Thus, providing a large fill factor, using traditional methods, can reduce contrast that is important to an autofocus system that relies on high contrast measurement of projected fringes. The present embodiment addresses this issue, by reducing the fill factor of the digital camera in a direction that improves the contrast at spatial frequencies near the Nyquist limit in that direction.

Figure 2:
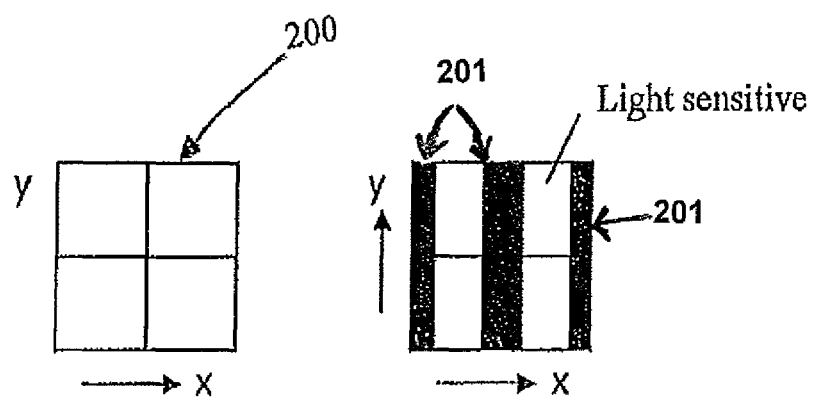
FIG. 2 is a schematic illustration of a pixel mask for practicing the present embodiment.

The present embodiment can be implemented by a pixel mask 200, as shown in FIG. 2. FIG. 2 on the left side shows 4 pixels of a CCD, with Original 100% fill factor. On the Right side FIG. 2 shows same 4 pixels with pixel mask to improve contrast in the x direction, according to the present embodiment. The pixel mask 200 has one dimensional mask with periodically arranged light reducing (typically, light shielding) portions 201. The periodical direction of the one dimensional mask is parallel to the x direction, in other words, one of pixel arrangement direction of the two dimensional array of the CCD. The one dimensional mask may be formed on the CCD. As illustrated by FIG. 2, the digital camera is not integrating over as large of a fraction of a fringe period, so the theoretical maximum contrast is increased from 0.667 to 0.909; an improvement of 36%. The 36% contrast improvement leads to a substantial improvement of the signal to noise ratio (SNR). For example, if the initial SNR was 100, it would now be about 100*√(0.909/0.667)=117. This is equivalent to improving the fringe projection (FP) system performance from 5 nm 3σ to 5/(1.17)=4.27 nm 3σ.

Figure 3:
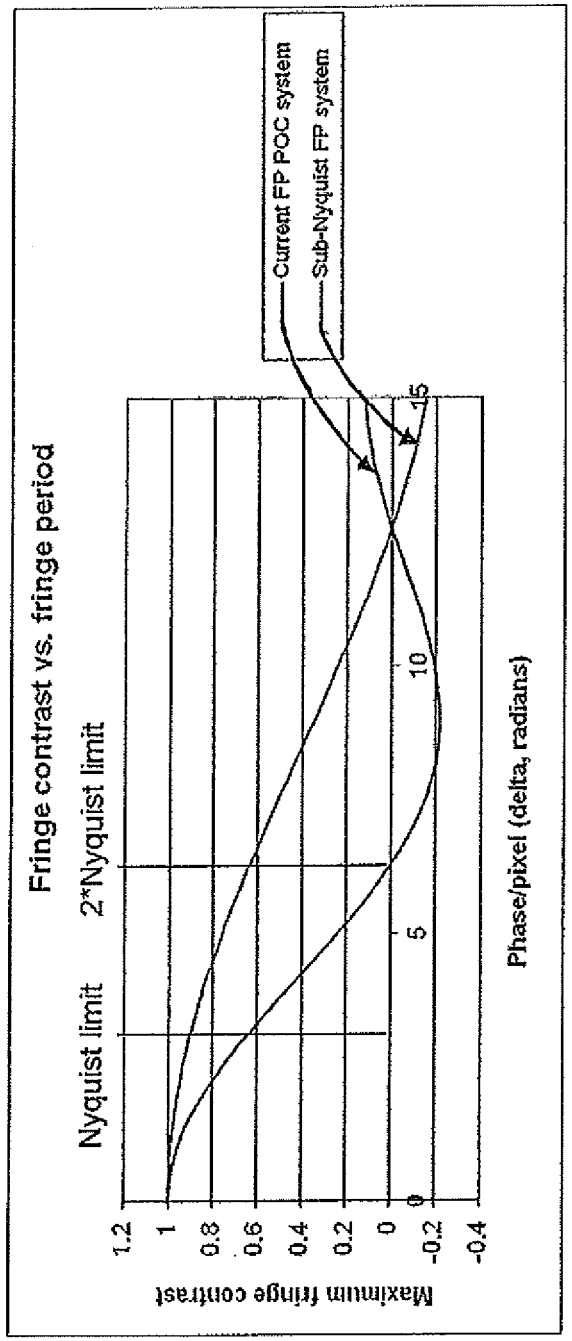
FIG. 3 shows the Maximum fringe contrast for two example systems; one with current pixels, other with Sub-Nyquist system resulting from applicant's pixel mask.

FIG. 3 shows the maximum fringe contrast for two example systems; one with current pixels, other with Sub-Nyquist system resulting from applicant's pixel mask.

Applicant's pixel mask 200 works best if it is integrated into the CCD camera manufacturing process during fabrication. The only downside is that because half of the light sensing area is now blocked, twice the light is required to maintain the same average signal level. However, when used with the AF system shown and described in application Ser. No. 13/066,741, there is enough light to easily make this tradeoff.

The NA of the optics need not increase to take advantage of this technique. However, another way to utilize a 1D Sub-Nyquist CCD in a FP autofocus system would be to double the fringe frequency, which would double the sensitivity to z. In this example, the fringe pitch could be reduced to 7.35 µm at the CCD, and the same initial contrast level of 0.667 would be maintained for 50% pixel fill factor. This would double the SNR, or take the 5 nm performance to 2.5 nm. The system NA would have to increase, however, which might make the optics more difficult to design and fabricate.

Thus, with the present embodiment, it is important to note that the use of a Sub-Nyquist digital camera with a FP autofocus allows a significant improvement in sensitivity, and is yet another system variable that can be used to design the most appropriate 450 mm autofocus system.

A traditional digital camera is capable of measuring spatial frequencies higher than the Nyquist limit (where the Nyquist limit depends only on the pixels pitch, or pixel spacing), but these higher spatial frequencies will alias. As is well known to those in the art, aliased spatial frequencies look like lower spatial frequencies than they actually are. For a camera with a mask as described here, the Nyquist limit is the same, and the contrast for spatial frequencies above the Nyquist limit is improved as shown in FIG. 3, but they are still aliased. Note that in a fringe projection system with a camera with lower fill factor in x, spatial frequencies at integer multiples of the Nyquist limit should still be avoided. An advantage of the fringe projection signal is that the spatial frequency is predetermined by the design of the system, and therefore the user knows if the detected signal has been aliased or not. If a periodic (in this case sinusoidal) signal is known to be aliased, it can easily be correctly interpreted as an aliased signal in the fringe projection processing software. In all cases, the improved contrast due to the pixel mask is beneficial.

Figure 4:
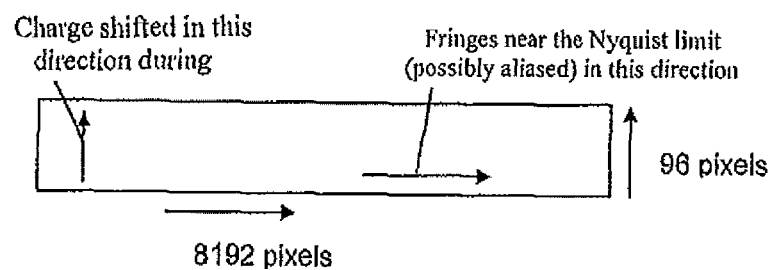
FIG. 4 schematically illustrates how the detector readout direction prevents electronic roll-off of image content near the Nyquist limit.

It should also be noted that the present embodiment works well with current CCD camera electronics. Many digital cameras intentionally 'roll-off' the contrast of the signal (i.e. the spatial frequencies that can be measured with the camera) in the electronics to prevent the user from aliasing and not understanding the consequences. The CCD currently being used is a line scan camera. Data is read off by shifting the charge in the y direction, (See FIG. 4), and so the electronics don't have the opportunity to artificially roll-off the contrast in the orthogonal x direction on the sensor.

The ID Sub-Nyquist camera allows improved z sensitivity and less susceptibility to random camera noise, and gives the autofocus system designer another variable that can be used to tune the system performance.

The present embodiment allows contrast of up to 0.9 or higher in the example system of application Ser. No. 13/066,741, which allows for better fringes and reduced sensitivity to camera noise, allowing better measurement of substrate topography.

The z-sensitivity of prior concepts of a fringe projection (FP) autofocus system is designed using trade-offs with optics magnification and other factors while using a reasonable optical magnification that matches with a commercially available CCD digital camera. In the prior concept, the fringes in the x direction have a pitch of about 14.7 µm at the CCD, which has 7 µm pixels. The Nyquist limit is well known and defined as two data points per period. Therefore a fringe pitch of 2*7=14 µm is the Nyquist limit for this sensor; a pitch of 14.7 µm is quite close to this limit.

For a purely sinusoidal signal, as a fringe is in an AF system, the contrast reduction can be calculated based on well known Equation 1 below:

$$\text{Contrast} = \text{sinc}\left(\frac{\Delta}{2}\right), \text{ where } \text{sinc}(x) = \frac{\sin(x)}{x}$$

Here Δ is the phase change in radians for a pixel. For example, a π/2 phase change across a pixel (4 pixels/fringe) leads to a maximum contrast of 0.90. In the prior FP system, Δ=(7/14.7)*2*pi=2.992 rad, which leads to a maximum contrast of 0.667. The root cause of the contrast loss is that the pixels, which have 100% fill factor, integrate over a large fraction of the sin wave.

It should be noted that the fringe pitch in the scan, or y, direction of the FP system is much lower than the Nyquist limit, and this is the direction in which the signals are processed. However, if the contrast is reduced in x, then the same limit applies in the y direction. The contrasts in x and in y are not independent.

The concept of the present embodiment is to apply a 1D mask to the CCD, so that the fill factor in the x direction is reduced from 100% to, say, 50%, but so the fill factor in the y direction remains at 100%.

According to the present embodiment the digital camera 102 has a two dimensional array of pixels, and the embodiment (e.g. provided by the mask 200 shown in FIG. 2) reduces the fill factor of light projected to the two dimensional array of pixels in one direction (e.g. the x direction in FIG. 2) where spatial frequencies are near the Nyquist limit, while substantially maintaining the fill factor in a transverse direction (the y direction) where spatial frequencies are not near the Nyquist limit.

When used with a fringe projection autofocus system of the type shown in FIG. 1, the fringe projection is from the substrate 104 that has a topography that has x, y and z components, where the digital camera 102 has a two dimensional pixel array extending in x and y directions, and reducing the fill factor in the one direction (e.g. the x direction) while substantially maintaining the fill factor in the y direction. The currently preferred implementation reduces the fill factor in the x direction by means of the one dimensional mask 200 (FIG. 2).

Thus, the foregoing detailed description shows how to improve contrast in a fringe projection autofocus system. With the foregoing description in mind, the manner in which contrast can be improved in various AF fringe projection systems and methods with contrast issues similar to those found in the AF fringe projection autofocus system shown and described herein will be apparent to those in the art.

The invention claimed is:

1. A method for improving contrast in a fringe projection autofocus system, the method comprising:
    scanning the substrate in a direction of a scan;
    forming an image of a fringe pattern, formed by a fringe projection portion of the fringe projection autofocus system on a substrate, at a surface of a digital camera by projecting light reflected from the substrate in a direction that is oblique with respect to the substrate,
        wherein said fringe pattern is spatially-periodic at least in a first direction, and said image being spatially-periodic at least in a second direction;
    reducing a fill factor of the digital camera in a chosen direction defined such as to improve the contrast at spatial frequencies near and above the Nyquist limit in the chosen direction,
    wherein said reducing includes reducing the fill factor in the direction of a scan while substantially maintaining the fill factor a direction transverse to the direction of a scan.

2. The method of claim 1, wherein the reducing includes reducing the fill factor of the digital camera that has a two-dimensional array of pixels, and
    further comprising reducing the fill factor of the two-dimensional array of pixels in the chosen direction along which spatial frequencies of a measurement signal are near and above the Nyquist limit, while substantially maintaining the fill factor in an other direction in which spatial frequencies of the measurement signal are not near the Nyquist limit, the other direction being transverse to the chosen direction.

3. The method of claim 2,
    further comprising detecting light forming said image with said digital camera configured to operate in a sub-Nyquist regime in a direction in which the two-dimensional array of pixels extends.

4. The method of claim 2, wherein the reducing includes operably cooperating a one dimensional mask with a surface of the two-dimensional array to cause said array to operate in a sub-Nyquist regime in one direction defined by said two-dimensional array.

5. The method of claim 1,
    further comprising cooperating a one-dimensional mask with a surface of the two-dimensional array of pixels, said mask being dimensioned to cause said two-dimensional array to operate in a sub-Nyquist regime along one of its two dimensions.

6. An apparatus configured to detect a surface position on a predetermined surface, the apparatus comprising:
    a fringe projection system configured to project optically a fringe pattern formed inside the fringe projection system onto the predetermined surface in a first direction that is oblique with respect to the predetermined surface to form a projected fringe pattern thereon, said projected fringe pattern being spatially-periodic at least in a second direction;
    a fringe relay system configured to project light from the projected fringe pattern, in reflection from the predetermined surface, to a detection surface to form an image of the projected fringe pattern thereon, said image being spatially-periodic at least in a third direction;
    a fringe detection system including a two-dimensional array of pixels arranged at the detection surface and a beam-passing section a dimension of which in the third direction is smaller than a period of said image in the third direction; and
    a processing system, operably connected to the fringe detection system and configured to receive data from the fringe detection system and produce an output representative of orientation of the substrate relative to a location of the image.

7. The apparatus of claim 6, configured as a fringe projection autofocus system reducing a fill factor of the two-dimensional array of pixels of a digital camera of the autofocus system in a spatial direction defined to improve contrast as measured in said spatial direction at spatial frequencies near the Nyquist limit.

8. The apparatus of claim 7, wherein the fringe projection autofocus system is configured to reduce the fill factor in a chosen direction in which spatial frequencies of a measurement signal are near the Nyquist limit, while substantially maintaining the fill factor in an other direction in which spatial frequencies of the measurement signal are not near the Nyquist limit, the other direction being transverse to the chosen direction.

9. The apparatus of claim 7,
    wherein the fringe projection autofocus system is configured
        to reduce said fill factor in a direction in which the substrate is being scanned during an operation of the apparatus, and
        to maintain said fill factor in a direction transverse to the direction in which the substrate is being scanned.

10. The apparatus of claim 9, wherein the fringe projection autofocus system includes a one-dimensional mask disposed on a surface of the two-dimensional array of pixels.

11. The apparatus of claim 6, configured as a fringe projection autofocus system and
   wherein the fringe detection system includes an optical detection unit configured to operate in a sub-Nyquist regime in one direction in which the two-dimensional array of pixels extends.

* * * * *